Nov. 1, 1960

W. H. GILLILAND 2,958,745

RIGID BUS SWITCHING STATION AND IMPROVED
SWITCH SUPPORT THEREFOR

Filed Nov. 14, 1958

INVENTOR
WILLIAM H. GILLILAND

BY Strauch, Nolan & Neale

ATTORNEYS

Nov. 1, 1960 W. H. GILLILAND 2,958,745
RIGID BUS SWITCHING STATION AND IMPROVED
SWITCH SUPPORT THEREFOR
Filed Nov. 14, 1958 7 Sheets-Sheet 6

Fig-9

INVENTOR
WILLIAM H. GILLILAND

BY Strauch, Nolan + Neale
ATTORNEYS

United States Patent Office 2,958,745
Patented Nov. 1, 1960

2,958,745

RIGID BUS SWITCHING STATION AND IMPROVED SWITCH SUPPORT THEREFOR

William H. Gilliland, Birmingham, Ala., assignor to USCO Power Equipment Corporation, Birmingham, Ala., a corporation of Alabama Filed Nov. 14, 1958, Ser. No. 774,006

21 Claims. (Cl. 200—48)

This invention relates to rigid bus switching stations for high voltage electrical transmission lines and improved switch supports therefor and is more particularly concerned with switch gear and the rigid bus conductor suspension apparatus applicable in power line switching stations of the outdoor high-tension kilovolt type that enables simplification of the required switching station equipment.

In outdoor switching stations of the high-tension kilovolt type, separate aerial polyphase bus conductor systems, comprising at least a main feeder system including rigid bus conductors and a branch or tap system are generally electrically interconnected through a series of disconnect switches. These aerial bus conductor systems are usually located at different elevations above the ground level and preferably cross each other. In known installations, the feeder mains are mechanically clamped off and supported by suspension structures separate from the switch gear which electrically interconnects the two conductor systems by mechanically relieved connecting leads. The switches in these known systems are customarily mounted on a separate platform or tower in elevated relation to the ground adjacent the rigid bus conductors. The general type of switch which conventionally is employed to perform this function of selectively establishing a circuit between separate conductor systems in these known installations is disclosed in the United State Letters Patent Number 2,231,992 to Fjellstedt dated February 18, 1941. As shown in this patent, switches of this general character comprise an elongated rigid base and three insulator stacks projecting perpendicularly from the base in spaced parallel relation, with two of the insulator stacks being disposed closely adjacent one another. The third insulator stack is widely separated from the other two stacks and terminates in a stationary contact. A movable switch blade mounted on the upper end of the two adjacent stacks is operated by a mechanism to swing the blade in an arc to and away from the stationary contact, respectively closing and opening the circuit. To mount switches of this type, a supporting structure of a length and width to accommodate the overall length of the switch base and the requisite real estate on which to erect the structure is necessary. The expense involved in providing for the necessary realty and erecting the support structure along with the triple insulator column disconnect switch is consequently high and notably substantial in switch gear of the kilovolt capacity generally required.

It has been proposed, in an attempt to reduce the costs and labor of installation involved, that the jaw contacts adapted to engage the switch blade for completing an electrical circuit be mounted directly on the uppermost bus conductor, thus eliminating the necessity for the one of the three insulator stacks which usually is required for supporting such contacts in the type switch referred to above. To this end, an example of the patented prior art is disclosed in United States Letters Patent Number 2,830,145 to Killian, issued April 8, 1958, wherein the stationary jaw contacts are mounted directly on the uppermost bus conductor. It will be appreciated from the foregoing that this prior proposal if applied to a polyphase switch station having rigid bus main feeder lines would require six or at least three additional insulator pillars and a separate switch support structure adjacent the conventional bus support lally columns conventionally provided.

A further prior proposal towards simplification in reference to the above-mentioned types of switches and switching stations to save and economize on supporting structure has been made as will be apparent from a consideration of United States Letters Patent No. 2,717,287 to Sihler et al., issued September 6, 1955. According to the structure disclosed in this patent, the terminal switch contact members of the cantilever supported disconnect switch insulator stacks form mechanical suspension means for the system conductors. Because of the wide spacing generally required between the terminal conductor connectors for high-tension kilovolt systems to avoid arcing, the revolvable insulator stacks and switch blade contact arms disclosed in this patent are consequently of prerequisite great lengths. For example, for high-tension systems such as 360 kv., the requisite spacing between bus connectors and the terminal switch contact members is generally 12 feet. In extending the cantilever support for the switch and the switch contact members across such a wide spacing, a high bending strain is imposed upon the terminal members and supporting pillars and increases as the spacing requirements increase for systems carrying current of greater potential. It will be appreciated that in order to structurally support blades and contact arms of such length, elaborate support structure of overall great manufacturing and installation expense would be required.

With the foregoing considerations and purposes in mind, therefore, it is the primary object of the present invention to provide a novel common insulator bus conductor and disconnect switch support for polyphase high-tension kv. power line systems wherein a disconnect switch is operatively supported on an existing insulator bus conductor lally support column.

A further major object of this invention is to provide a novel common insulator bus support and disconnect switch support column for a rigid polyphase bus conductor switching station having vertically spaced apart aerial bus conductor systems wherein associated rigid bus conductors and disconnect switches are held directly by common disconnect switch lally support columns having a single insulator stack terminating in a bus suspension clamp upon which the disconnect switches are operatively mounted to establish an electrical circuit between the respective bus conductors of the aerial systems.

Still another object of this invention is to provide a novel bus conductor disconnect switch lally column embodying a single insulator stack terminating in a combined bus clamp and switch mounting bracket for holding an associated aerial bus conductor in suspension and supporting the switch wherein substantially no bending strains are imposed on the combined bus clamp and switch mounting bracket by the weight of the supported disconnect switch.

Another object of this invention is to provide a novel switch gear support for connecting a rigid, high-tension, feeder bus conductor of a switching station to branch kv. aerial power line systems that accommodates and affords a substantial reduction in expense of materials and installation.

It is still a further object of this invention to provide a novel high-tension kv. bus conductor disconnect switch apparatus for mounting on a lally column support having a single insulator stack terminating in a bus conductor supporting clamp wherein a disconnect switch comprising a switch blade arm, is twistably and rotatably mounted on the bus conductor supporting clamp for arcuate movement in a vertical plane between a substantially horizontal position and a substantially vertical position without imposing appreciable bending strains on the bus support clamp.

A still further object of this invention resides in the provision of an improved rigid bus conductor switching station embodying improved isolating disconnect switch gear of sturdy construction for assuring a long useful life and optimum performance, and at the same time affording the user substantial economy in terms of cost, installation and right-of-way space required in setting up the switching station.

A still further object of this invention resides in the provision of a bus conductor disconnect switch gear apparatus and support which is simple in construction and comparatively inexpensive to manufacture.

Further objects of the invention will appear as the description proceeds in connection with the appended claims and annexed drawings wherein:

Fgure 5 is an enlarged fragmentary top plan view illustrating the jaw contact assembly of Figure 2.

Figure 1:
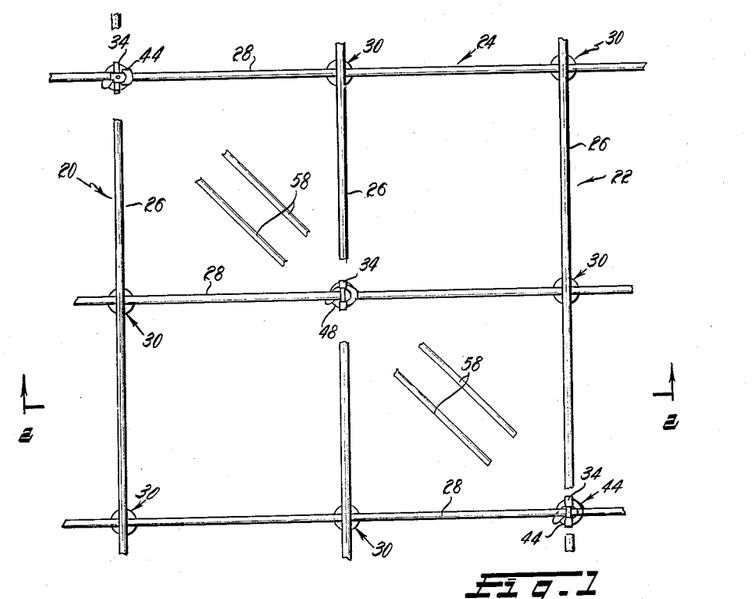
Figure 1 is a schematic top plan view of a switching station constructed according to a preferred embodiment of this invention.
Figure 2:
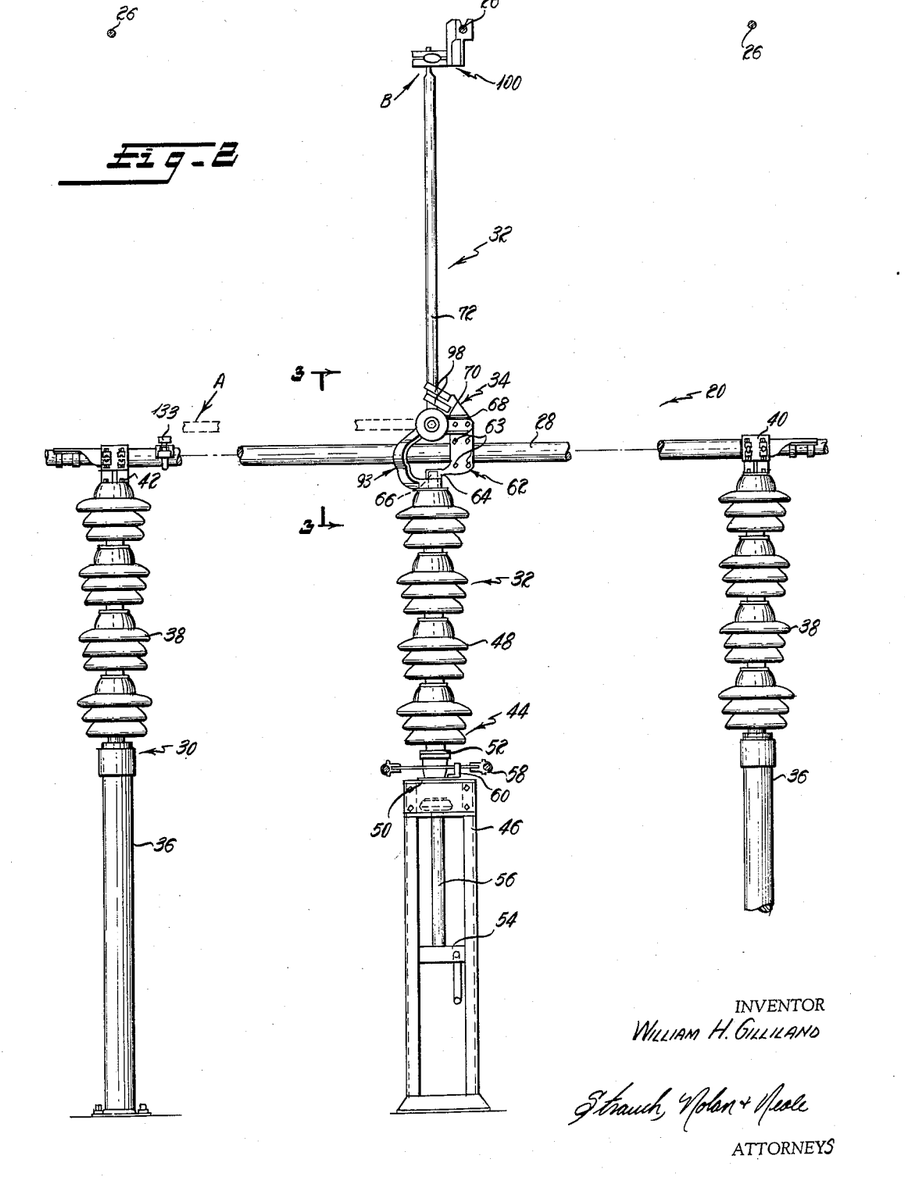
Figure 2 is a sectional view taken substantially along the line 2—2 of Figure 1.

Referring now to the drawings and more particularly to Figures 1 and 2, a high-tension kv. cross country transmission line switching station generally designated at 20 is illustrated comprising two conventional three-phase serial bus conductor systems 22 and 24 preferably crossing each other at right angles and located one over the other at a selected spaced distance apart. The overhead bus conductor system 22 includes a series of three equidistantly spaced apart aerial bus conductors 26 conventionally supported in the same elevated horizontal plane. Similarly, the lower bus conductor system 12 is illustrated to include a series of three equidistantly spaced apart aerial rigid bus conductors 28. These bus conductors 28 are aerially supported in the same horizontal plane in respective juxtaposition to the series of overhead bus conductors 26 by a series of lally columns spaced axially apart intermediate the ends of the conductors in conventional manner. In order to establish an electric circuit between the respective conductors of the bus systems 22 and 24, a polyphase disconnect switch apparatus 32 comprising a rotatable blade type disconnect switch 34 for each of the three phases is provided and mounted on a diagonal series of the lally columns as will be presently described. Where desired, the conductors 26 of the overhead system 22 may be positioned parallel to the conductors 28 of system 24.

The bus supporting lally columns include a first series 30, each of conventional construction embodying a base 36 built up by any suitable structural forms (Figure 2). An insulator stack 38 which is of conventional construction is non-rotatably mounted at the upper end of each base 36 to extend vertically upwardly and having its axis substantially intersecting the axis of its associated supported bus conductor 28 and terminating in a through bus support clamp 40 fixedly secured to the top of the insulator stack by mounting screws 42.

In accordance with this invention, the diagonally related series of lally columns are of special construction and indicated by numeral 44. Columns 44 support their associated bus conductors 28, as part of the overall bus supporting structure and additionally directly mount the disconnect switches 34. Each includes a framework base 46 built up of suitable structural forms. A suitable insulator stack 48 of conventional pin type construction is mounted at the upper end of the base 46 for rotation about its vertical axis which intersects the axis of the respective associated supported bus conductor 28 by means of a ball bearing 50 or other suitable antifriction bearing construction supported from the base 46. The supporting pin 52 of insulator stack 48 is rotatably mounted in the bearing 50 for movement by a suitable manual or motor switch operating mechanism 54 having a coaxial connecting operating rod 56 journalled in bearings (not shown) formed in or otherwise secured to the framework of base 46 and fixedly secured to the insulator stack pin 52 by a pin (not shown) or other suitable means.

In practice, in polyphase systems, interphase operating rods 58 (Figure 1) interconnect each of the three rotatable insulator stacks 48 through brackets 60 to be gang operated in the conventional manner for facilitating simultaneous actuation of the three polyphase switches.

Each of the insulator stacks 48 terminates in a through base clamp 62 of the split type (Figures 2 to 4) secured rigid with the bus conductor 28 through a clamp cap and securing screws 63 and having a journal portion 64 which is journalled at the end of a coaxial stub shaft 66 extending from the top of insulator stack 48. At the upper end of and symmetrically above the associated insulator stack 48, the clamp 62 is provided with extension bracket arms 68 which provide aligned pivot pin openings functioning to pivotally support pins 70 carrying the disconnect switch 34 as will presently be described. While a through bus type clamp 62 is preferred, it is to be understood that the bus clamping portion of base clamp 62 could, if desired, be offset to one side or the other of the stack axis to dispose the bus bar and switch arms 68 in side-by-side relation.

Figure 3:
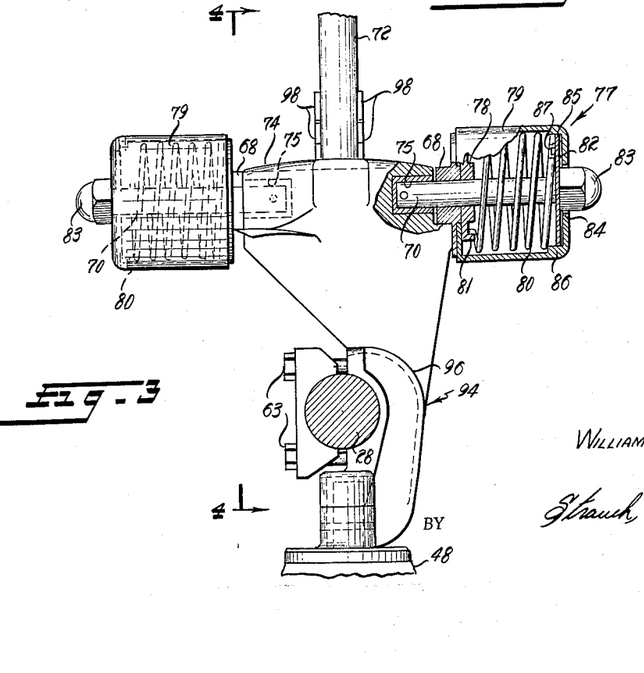
Figure 3 is an enlarged sectional view taken substantially along the line 3—3 of Figure 2.
Figure 4:
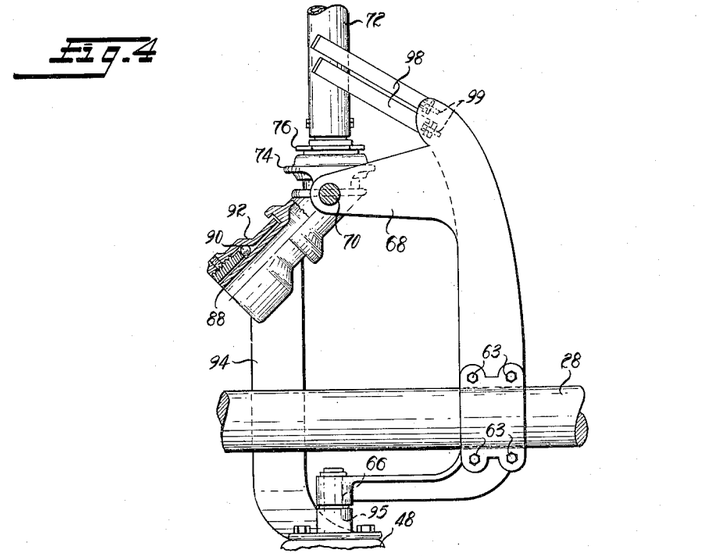
Figure 4 is an enlarged sectional view taken substantially along the line 4—4 of Figure 3.

Referring now to Figures 3 and 4, each switch 34 comprises a switch blade 72 rotatably journalled in a blade supporting hinge casting 74 having opposed sockets 75 in which the inner ends of support pins are fixed in any suitable manner to assure unitary pivotal movement of hinge casting 74 and pins 70. The blade supporting hinge casting 74 rotatably receives switch blade 72 in a suitable bearing structure including adjusting nut 76. Thus, blade 72 is journalled in hinge casting 74 so as to freely rotate about its axis while at the same time being confined to pivot about the horizontally disposed axes of pins 70 and the openings provided in extension bracket arms 68 which are transversely related to blade 72 and its associated bus conductor 28. To resiliently resist rocking of the support pins 70 and switch blade 72, a torsional spring assembly 77 is provided comprising a circular plate 78 which is coaxially fixed to each pin 70 outwardly from the extension bracket arms 68. Each of the circular plates 78 forms an end wall for a tubular housing 79 mounted on bracket arms 68 concentric with the axis of the support pins 70. Concentrically mounted in each housing 79 is a counterbalancing coiled torsion spring 80 which is anchored at its inner end to a projection 81 from on the side face of plate 78.

At the other end of the housing 79, an adjustment plate 82 having a hexagonal or other non-circular boss 83 projecting through an opening 84 in the housing so as to be available for manipulation by a tool is slidably mounted on its associated support pin 70. This adjustment plate 82 is formed with a series of peripheral notches 85 adapted to coact with radial lugs 86 formed on the interior of housing 79. The outer end of spring 80 is anchored to plate 82 at projection 87.

Thus, the springs 80 resiliently resist rocking of pins 70. When it is desired to vary the torsional resistance applied by the springs 80, the adjustment plate 82 is pushed inwardly to clear the lugs 86 and then rotated by applying a wrench to boss 83 to wind or unwind the spring. After the desired resistance is obtained, the plate 82 is released to re-engage with lugs 86 by the bias of springs 80.

In order to rotate the switch blade 72 about its longitudinal axis as permitted by the bearing in the hinge casting 74 and also to swing the switch blade 72 between a substantially vertical position as shown in Figure 2 and indicated at B and a horizontal position indicated at A (Figure 2), the blade 72 is provided with offset end 88 that extends away from the switch blade 72 as illustrated more clearly in Figure 4 of the drawings. The end 88 extends substantially at an angle of 45° to the longitudinal axis of the blade and is journalled by a bearing 90 in a bearing socket portion 92 of a switch operating arm 94 that is secured by a pin 95 or other suitable fastening means to the top of the stub shaft 66 of the rotatable insulator stack 48 for rotation therewith. The central portion of the switch operating arm 94 is offset to one side of and arcuately curved to clear its associated bus conductor as indicated at 96 in Figure 3.

In order to establish an electrical circuit path between the switch blade 72 and its associated bus conductor 28, the clamp 62 carries a pair of U-shaped spring contact members 98 secured thereto by mounting screws 99 or other suitable means as best shown in Figure 4. The contact members engage switch blade 72 between them when the blade is rotated to its circuit closed vertical position and disengages therefrom as the blade is arcuately swung to an open horizontal position.

With reference to Figures 1 and 2, a stationary jaw contact assembly 100 for each disconnect switch is mounted directly on and carried by the overhead bus conductors 26 substantially perpendicularly above the pivot axis of the switch blade 72 and provides the contact means for establishing a circuit path between the switch blade 72 and the overhead bus conductor 26.

Figure 5:
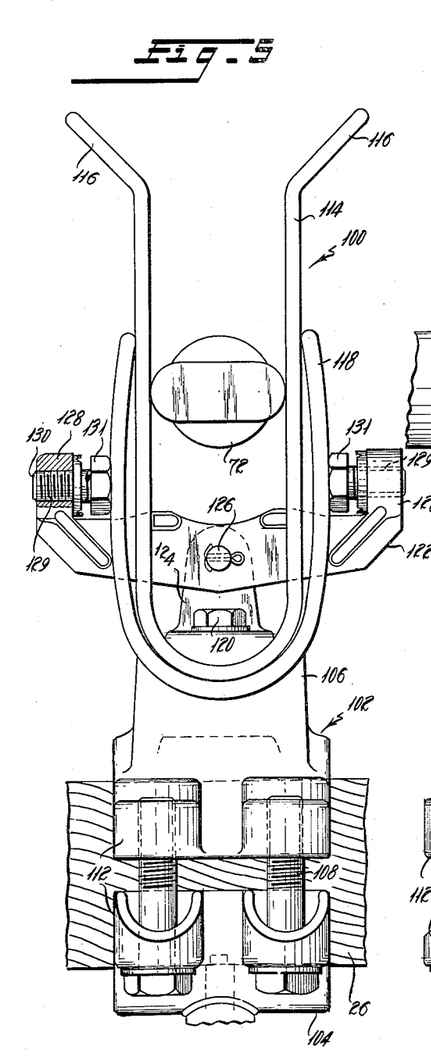
Figure 6:
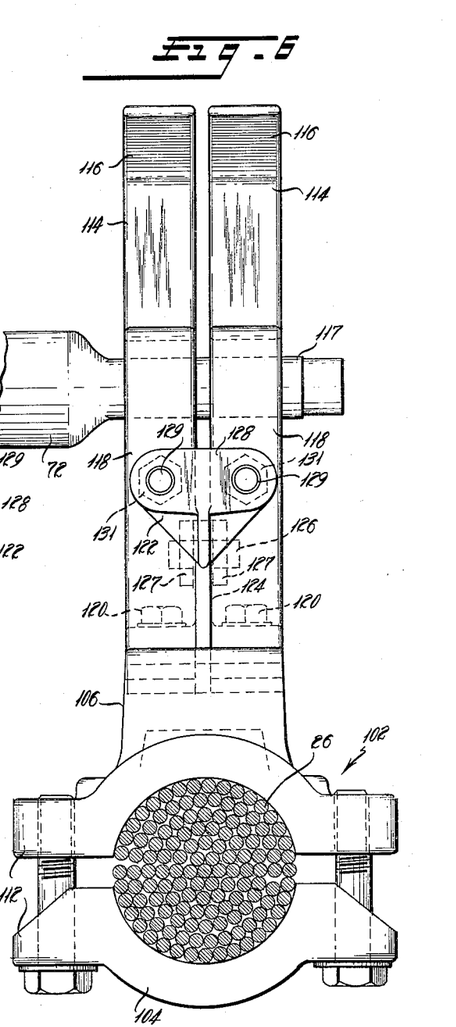
Figure 6 is an enlarged end view of the jaw contact assembly illustrated in Figure 5.

Referring now to Figures 5 and 6, the jaw contact assembly comprises a through bus conductor clamp 102 of the split type having a clamp cap 104 and a clamp shank portion 106 which are clamped or otherwise rigidly secured to the bus by machine bolts 108 received in suitably threaded apertures formed in flange members 112 of the clamp cap and shank portion. Mounted on the shank portion 106 of the clamp 102 are a pair of juxtapositioned U-shaped contact members 114, the blade arm portions of which open in the direction of the movement of the switch blade and which terminate in outwardly flared sections 116 to receive the edges of the flattened end 117 of the switch blade 72 as will be described. Generally U-shaped reinforcing springs 118 serve to urge the respective arms of the contact members 114 toward each other to provide the requisite contact pressure with the switch blade. The respective associated pairs of springs 118 and U-shaped contacts 114 are secured to the shank portion 106 of clamp 102 by machine bolts 120 which extend through aligned apertures formed in the curved portions of the springs and contact members to be threadedly received in an internally threading bore formed in the shank portion.

The tension of the springs 118 is made adjustable by a yoke section 122 removably mounted on a ledge portion 124 of the clamp shank 106 by a pin member 126 or other suitable means. The spaced apart center portions 127 of the yoke 122 merge together around ledge 124 and terminate in opposed laterally directed flange members 128 having opposed respective pairs of coaxial threaded apertures as indicated at 129 facing the sides of the arms of respective ones of the tension springs 118. Mounted in each threaded aperture is a spring tension adjusting screw 130 having its head 131 abutting opposing sides of the springs so as to selectively vary the pressure of the spring applied to the associated contact members 114 and to maintain a high contact pressure on the edges of the flattened end 117 of blade 72.

The bus clamp U-shaped contact members 98 and the jaw contacts 114 are interconnected in the vertical closed switch position by the switch blade 72. Thus, when the insulator stack 48 is rotated by the operating rod 56 from the position illustrated in Figure 1 at B, the switch blade 72 will be rotated first about its axis in hinge casting 74 to relieve the pressure between the high pressure U-shaped contacts 114 by moving the small area edges of the flattened blade end 117 out of engagement with the corresponding surfaces of the U-shaped jaw contacts. Simultaneously, the rotation of the insulator stack 48 and of the switch operating arm 94 causes the switch blade 72 to rotate about the transverse horizontal pivot axis of pins 70. As the blade 72 is pivoted, the blade hinge casting 74 permits switch blade 72 to continue rotation about its own axis, this movement being facilitated by the bearing 76. A rubber snubber blade stop 133 is clamped to the conductor 28 by any suitable means to provide a cushioning support for the blade 72 in its open horizontal position.

When the insulator stack is rotated in the reverse direction, the switch blade is arcuately swung from the position indicated at A through a 90° arc to the switch closed position indicated at B. At the same time, the switch blade 72 is rotated about its axis in the manner previously described, its final rotation about this axis taking place as it enters between the jaws contacts 114 and approaches the substantially upright vertical position so that final movement thereof causes the blade to move into high pressure contact engagement with the contact members 114 and 98 simultaneous with the remaining arcuate movement about the switch blade pivot axis at 80 in well known manner. This permits the necessary torque to be transmitted through the switch blade 72 for rotating it into the switch closed position with the contact surfaces of the flattened end 117 under relatively high pressure.

Figure 7:
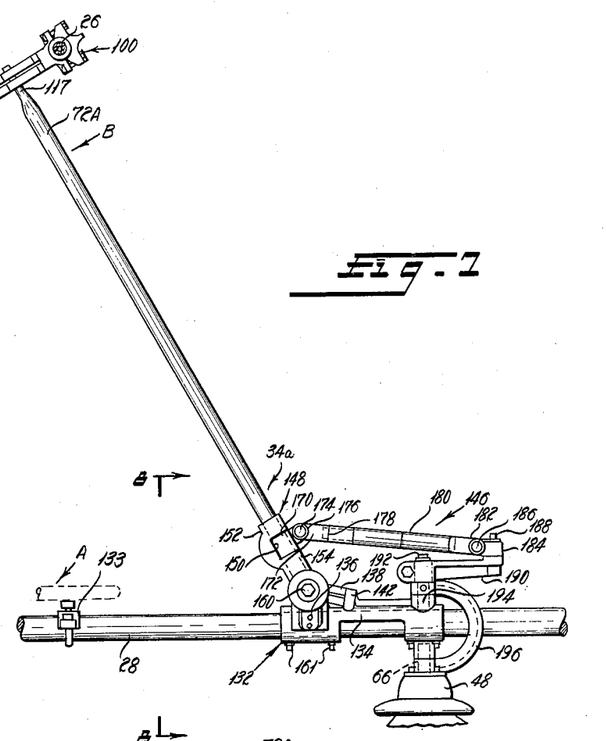
Figure 7 is a fragmentary side elevational view illustrating a disconnect switch and mounting bracket and bus clamp according to a further embodiment of this invention.
Figure 8:
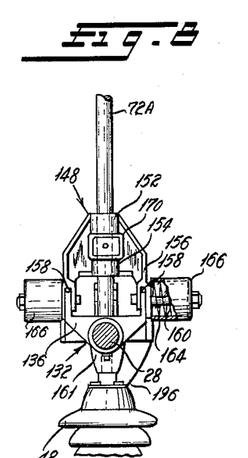
Figure 8 is a sectional view taken substantially along the line 8—8 of Figure 7.
Figure 9:
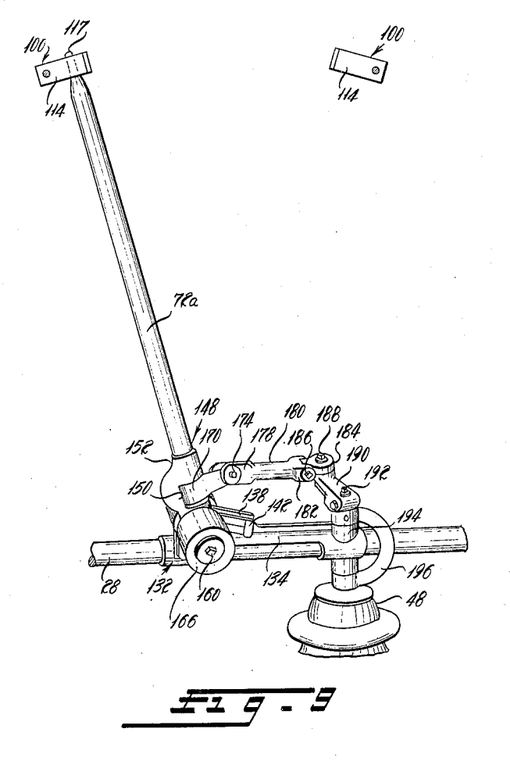
Figure 9 is a perspective view of the disconnect switch illustrated in Figure 7 modified to have a vertical open blade position so as to cooperate with alternate dual parallel upper bus arrangements.

Referring now to Figures 7–9, the switch blade structure illustrated therein operates and cooperates with jaw contact 100 in a substantially identical manner to that shown in Figures 1–6 and described in connection therewith. However, the switch blade operating linkage which operably interconnects the tubular switch blade 72 with the rotatable insulator stack 48 and the bus conductor clamp 132 which supports the lower bus conductor 28 and directly provides a mounting for the disconnect switch differs considerably. With continued reference to Figures 7–9, the switch 34a is mounted on a bus conductor clamp 132 of the split through conductor type journalled on the stub shaft of the insulator stack 48.

The clamp 132 in the embodiment illustrated in Figures 7–9 comprises an elongated body portion 134 which terminates at one end in a cylindrical pivot section base 136 for pivotally mounting the disconnect switch 34a as will be described. As previously described, the jaw contact assembly 100 is mounted directly on the single overhead bus conductor 26 (Figure 7) or the dual parallel bus conductor system made up of spaced bus conductors 26 equally spaced laterally with respect to a vertical plane containing the pivot axis 160 of the switch arm (Figure 9). In either case, the jaw contact assemblies 100 are disposed for engagement with the flattened beaver tail 117 formed at the end of switch blade 72. The opposite fixed contact 138 for the lower bus conductor 28 is similarly of U-shaped formation to cooperate with the switch blade 72 and is secured to the extension 134 of clamp 132 at 142 by any suitable means such as mounting screws.

The switch blade 72, in accordance with this embodiment of the invention, is pivotally and twistably supported on the clamp 132 which also mounts the disconnect switch linkage which is generally designated at 146. The other cylindrical end of blade 72 opposite the beaver tail 117 is mounted in the dual axis support bearing casting 148 having the slotted portion 150 provided with spaced apart sleeve bearings 152 and 154 for axially supporting the blade 72 for rotation about its axis. Casting 148 also has a bifurcated portion 156 (Figure 8) straddling the end of blade 72 to suitably form spaced apart bearings at 158 pivoting casting 148 for bodily movement with blade 72 on a transverse axis intersecting at right angles to the blade axis in the contact area of contact 138. The bifurcated portion 156 is pivotally supported on a pair of spaced apart coaxial bearing screws 160 which are secured in spaced apart legs formed by the pivot section 136 transversely of the blade axis. Suitable set screws 161 fix pivot section base 136 rigidly to bus 28 to form a good electrical contact between conductor 28 and clamp 132.

Counterbalancing torsion springs 164, similar to springs 80 heretofore described, are mounted concentrically with the bearing shafts 160 in the housings 166 supported by the bearing shafts.

With continued reference to Figures 7–9, blade twisting ferrule 170 is fixedly secured to a blade 72A omitting the 45° hinge and segment between bearings 152 and 154 to cooperate with the sides of the slotted portion 150 for preventing endwise movement of the switch blade. A rigid operating rod terminal 172 is pivotally connected to the twisting ferrule 170 by a pin 174 at its clevis end portion 176. It will be appreciated that this pivotal joint at pin 174, while being rotatable about the axis of the pin, is rigid in the direction of the switch pivot indicated at 160, so that force can be applied laterally through this pivotal connection to turn or rotate the switch blade 72 about its own axis.

At the end of the rod terminal 172 opposite to the pivotal connection to pin 174, a laterally rigid swivel 178 is provided for, which facilitates connection to a coaxial rigid rod 180 and permits relative twisting of the terminal 172 and rod 180 about their respective coinciding axes. The rod 180 terminates at its other end in a clevis portion 182 which is pivotally connected to a universal knuckle 184 by pin 186 providing a horizontal axis transverse to the switch blade 72A and parallel with the pivotal connection at 174. The universal knuckle 184 is rotatably mounted on vertical pin 188 extending from the top of and secured in the rigid switch operating crank arm 190 adjacent the outer swingable end thereof. This crank arm 190 is non-rotatably secured at its opposite end to a vertically standing stub shaft 192 journalled in a bearing boss 194 of clamp 132. Rotation of the stub shaft 192 and consequently operation of the switch blade 72A through its accompanying linkage is accomplished by a switch operating arm 196 which is non-rotatably secured at its upper end to shaft 192 and pinned or otherwise non-rotatably mounted at its lower end to stub shaft 66 of the rotatable insulator stack 48.

As will be apparent from the foregoing, the operation of the embodiment of the disconnect switch illustrated in Figures 7–9 results in substantially the same movement of the switch blade 72A as achieved with the disconnect switch operating linkage described in conjunction with the embodiment illustrated in Figures 1–6. The switch as illustrated in Figure 7 is in its fully closed position as indicated at B, having its beaver tail 117 extending substantially transversely between the jaws 114 of contact assembly 100, spreading these jaws against the bias of the springs 118 to provide a high pressure contact and crank arm 190 paralleling conductor 28. Thus, when the rotatable insulator stack 48 is bodily rotated to arcuately move crank arm 190 about its pivot connection 192, generally paralleling the switch blade bearing pivot 160, the switch blade 72 initially is twisted around its own axis with little swinging movement about its bearing pivot 160, which twisting is accomplished by rod 172, swivel 178, rod 180, and the universal knuckle 184 acting as rigid members in the direction of the axis of the switch bearing pivot 160. In this manner, the major lateral component of crank arm motion is transmitted to the twisting ferrule 170 to twist the blade 72A while the smaller axial component is absorbed by the relative movement of rod 180 and universal knuckle 184. When the switch blade 72A has been twisted rotatably about its axis sufficiently to relieve the pressure between the high pressure U-shaped contact surfaces 114 by moving the contacting edges of the beaver tail 117 out of engagement therewith, further rotation of the insulator stack 48 causes the crank arm 178 to swing further about its axis 192 in an arcuate path generally paralleling conductor 28 to swing the rods 172 and 180 axially toward the switch blade 72A, with the then smaller lateral component being absorbed by twisting of rod 180 about its swivel connection to rod terminal 172. This continued crank arm motion results in a rotation of the swtich blade 72A about bearing pivot axis 160 until the blade reaches its horizontal fully opened position indicated at A (Figure 6). To close the switch from its open position indicated at A (Figure 6), the operation is the reverse of the above operation for opening the circuit and is accomplished by bodily rotating the insulator stack 48 and crank arm 190 in the opposite direction.

Figure 10:
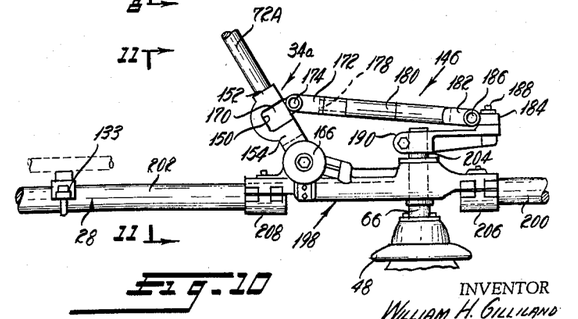
Figure 10 is a fragmentary side elevational view illustrating a disconnect switch and mounting bracket and bus clamp according to a further embodiment of the invention.
Figure 11:
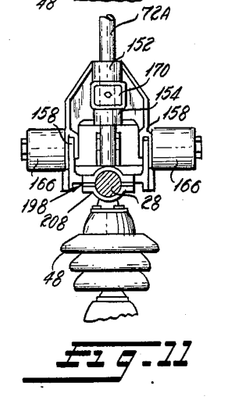
Figure 11 is a sectional view taken substantially along line 11—11 of Figure 10.

Referring now to Figures 10 and 11, the structure illustrated therein is substantially identical with that shown in Figures 7–9 and described in connection therewith, with the exception of the bus support and disconnect switch clamp 198. This clamp 198 is adapted for use with a split bus conductor having two axially aligned sections 200 and 202 as opposed to the continuous one-piece bus conductor 28 described in connection with the embodiments illustrated in Figures 1–9.

With continued reference to Figures 10 and 11, as previously described, the clamp is journalled to the stub shaft 66 extending from the top of the insulator stack 48. The stub shaft 66 in this embodiment, however, extends through clamp 198 and projects therebeyond as indicated at 204 to intersect with the common axis of the bus conductor sections 200 and 202. The rigid crank arm 190 is suitably non-rotatably secured to the projecting end of the stub shaft 66 for connection to the switch operating linkage as described in connection with the embodiment illustrated in Figures 7–9. The adjacent ends of the bus conductor sections 200 and 202 are supported in separate clamping elements formed by the clamp 198 at 206 and 208 respectively. The clamping elements 206 and 208 each are provided with conventional set screws 209 which serve to position and further hold the respective bus conductor sections 200 and 202 from longitudinal movement. It will be appreciated that the necessity of providing for a switch arm and an additional shaft member as respectively indicated at 196 and 192 in the embodiment illustrated in Figures 7–9 is obviated in this present embodiment since the stub shaft 66 now performs the function of the switch arm and the additional shaft.

Figure 12:
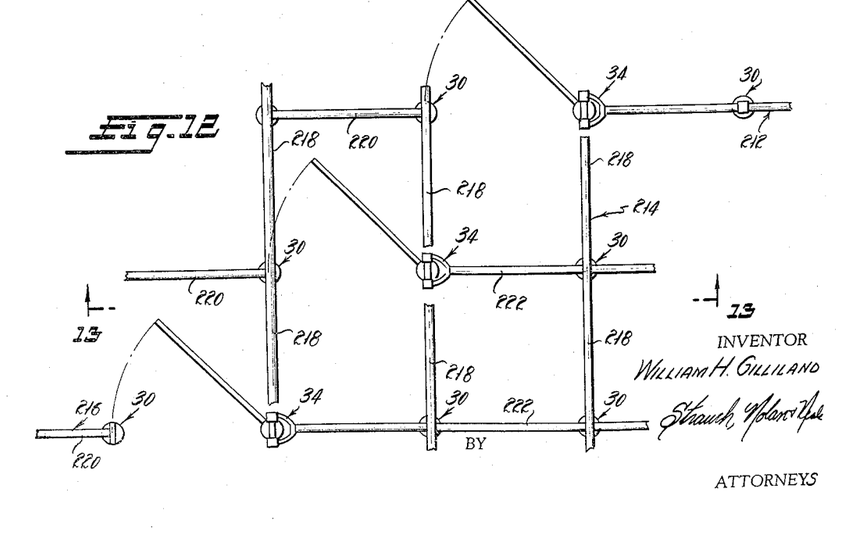
Figure 12 is a schematic top plan view of a switching station according to a further embodiment of the invention for use where the main feeder system and branch or tap system lie in end-to-end relation.
Figure 13:
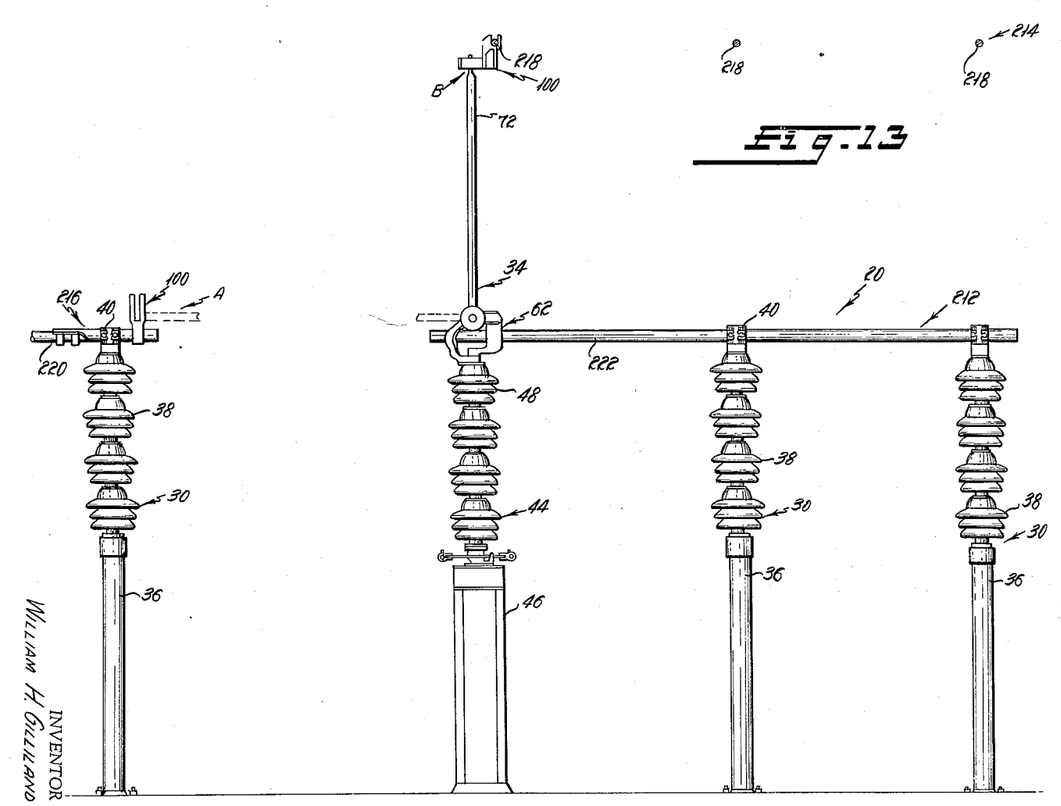
Figure 13 is a sectional view taken substantially along the line 13—13 of Figure 12.

Referring now to Figures 12 and 13, the structure illustrated therein is substantially identical with that shown in Figures 1–6 and described in connection therewith, with the exception of the relative positioning of the current carrying bus conductor systems. With continued reference to Figure 12, the switch station 20 is illustrated to comprise a main feeder rigid bus conductor system 212 and two separate branch bus conductor systems indicated at 214 and 216 respectively. As previously described, the branch conductor system 214 is supported by any suitable means a selected vertical distance above the main feeder conductor system 212 and is illustrated to extend perpendicular thereto. The second branch bus conductor system 216 is positioned and supported by a series of lally columns 30 in end-to-end spaced apart relation with the main feeder system 212 in substantially the same horizontal plane therewith. Each of the branch systems and main feeder systems are composed of a series of bus conductors which are preferably three in number for three phase operation as respectively indicated at 218, 220 and 222 (Figure 12).

The respective bus conductors 218 and 220 of the branch systems 214 and 216 are provided with jaw contact assemblies 100, the structure of which has been previously described. The bus conductors 222 of the main feeder system 212 which are rigid buses supported as previously described by the series of lally columns 30 and 44 are further provided as hereinbefore described with a series of gang operated disconnect switches 34 pivotally mounted on the clamps 62 of the lally columns 44. In this embodiment, the lally columns 44 for each of the three phase lines constitute the adjacent end columns. The blades 72 of the disconnect switches through arcuate and twisting movement between a horizontal position indicated at A and a vertical position indicated at B respectively engage with the jaw contacts 100 mounted directly on the conductors of the lower branch system 216 at position A and the jaw contacts 100 mounted directly on the conductors of the overhead branch system at position B. These disconnect switches establish a circuit path between the blade 72 and its associated bus conductor clamp 62 through the hinge casting 74 as previously described.

Thus, an electrical circuit may be selectively established between the main feeder system 212 and the branch system 216 or between the main feeder system and the overhead branch system 214 when the switch blade is moved to either of its horizontal and vertical positions respectively. Consequently, in accordance with a feature of this invention, a current carrying circuit path is selectively established between the system 212 and system 214 or between the system 212 and system 216. It will be appreciated and understood from the foregoing that, when desired, two separate branches may be alternately supplied by the main feeder system or two separate sources of current supplied through the system 214 and 216 may alternately be fed into a single tap bus conductor system such as 212 thereby maintaining an auxiliary or standby power supply to a user such as a hospital or the like through the series of disconnect switches 34 of a switching station as illustrated and described previously.

It further will be appreciated that in lieu of the disconnect switch described in connection with the embodiment illustrated in Figure 12, the disconnect switches described in connection with the embodiments illustrated in Figures 7–11 may alternately be employed where desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an electric power switching station comprising a rigid aerial bus conductor, a plurality of lally columns supporting said conductor at spaced intervals intermediate the ends thereof and each comprising a support base and a single insulator stack projecting vertically from said base and terminating in a bus conductor clamp element for rigid clamping about said bus conductor in supporting relation, the improvement which comprises rotatably mounting one of said insulator stacks and providing its associated clamping element with a journalled connection to said rotatable stack and an extension terminating in a switch hinge pivot, journalling a switch blade member in said switch hinge pivot for arcuate movement between a substantially horizontal position and a substantially vertical position, and mounting switch blade actuating means on said rotatable insulator operably interconnecting said switch blade member and its associated insulator stack to effect swinging and twisting operation of said switch blade member upon rotation of said rotatable insulator stack thereby effectively connecting and disconnecting said rigid aerial bus conductor to one or more juxtaposed aerial conductors.

2. A rigid bus conductor switching station for kv. power line systems comprising a series of rigid bus conductors, a series of aerial bus conductors spaced from said series of rigid bus conductors, said series of aerial bus conductors being equal in number to and in respective juxtaposition to said series of rigid bus conductors, a switch contact member mounted on each of said aerial bus conductors of said second series, a plurality of lally columns supporting said series of rigid bus conductors at spaced intervals intermediate the ends thereof whereby one of said lally columns is substantially aligned with each of said contact members, each of said lally columns comprising a support base and a single insulator stack projecting vertically from said base and terminating in a bus conductor clamping element for rigid clamping about its associated rigid bus conductor in supporting relation thereto, one of said clamping elements of each of said series of rigid bus conductors having an extension terminating in a switch hinge pivot, a disconnect switch blade member individual to and supported by a respective one of said last mentioned lally column insulator stack clamping elements for arcuate movement in a vertical plane between a generally horizontal position and a substantially vertical upwardly extending position, said blade member being of a length to engage respective ones of said contacts for establishing an electrical circuit between respective ones of said rigid bus conductors and said aerial conductors, and actuating means operably interconnecting each of said switch blade members and its associated insulator stacks, each of said respective associated insulator stacks being rotatably supported by its lally column base journalled in its associated clamping element to effect operation of said switch blade members upon rotation of the respective associated insulator stacks.

3. The switching station of claim 2 wherein said switch contact members each comprise spaced jaws terminating in flared portions for receiving respective ones of said switch blade members therebetween.

4. The switching station of claim 2 wherein said switch blade members each comprise a switch blade having a contact engaging beaver tail end and terminating in a journal section at its other end journalled in said switch hinge pivot and wherein said actuating means comprises means operably connected to said switch blade member to twist said switch blade in its associated contact jaws for engaging the beaver tail end of said blade edgewise therebetween.

5. The switching station of claim 4 wherein said ones of said clamping elements comprise a through conductor clamp and said actuating means comprises a switch operating arm mounted for rotation with its associated insulator stack at the upper end thereof and extending upwardly and around its associated rigid bus conductor, a crank arm operably connected at one end to the upper end of said switch operating arm for swinging movement on an axis transverse to the axis of said switch hinge pivot, a universal knuckle pivotally connected to the opposite end of said crank arm for swinging movement therewith, a rod pivotally connected to said knuckle joint on an axis parallel to said switch blade hinge pivot axis, said rod terminating in a swivel joint rigid in the direction of said switch blade hinge pivot axis, a rod terminal connected with said rod by said swivel joint and a blade twisting ferrule fixedly joined to said blade and pivotally connected to said rod terminal at the end opposite from said swivel joint on an axis parallel to said switch blade hinge pivot axis, said rod and said terminal being rigid in the direction of said switch blade hinge pivot axis.

6. The switching station of claim 4 wherein said rigid bus conductor comprises axially spaced conductor elements, said clamping element comprises at least two interconnected spaced apart clamp sections adapted to join the ends of bus conductor elements, said actuating means comprises a stub shaft non-rotatably mounted on the upper end of its associated insulator stack and extending upwardly between said clamp sections at right angles to said switch hinge pivot axis and journalled in said clamping element, a crank arm mounted at the end of said stub shaft for rotation with said shaft and its respective associated insulator stack, a universal knuckle pivotally connected to the swing end of said crank arm for swinging movement therewith, a rod pivotally connected to said knuckle joint on an axis parallel to said switch blade hinge pivot axis and terminating in a swivel joint rigid in the direction of said switch blade hinge pivot axes, a rod terminal connected with said rod by said swivel joint and a blade twisting ferrule fixedly joined to said blade and pivotally connected to said rod terminal at the end opposite from said swivel joint on an axis parallel to said switch blade hinge pivot axis, said rod and rod terminal being rigid in the direction of said switch blade hinge pivot axis.

7. The switching station of claim 2 wherein said switch blade members adjacent said respective clamping elements have angularly offset portions, said clamping elements comprise at least one through bus conductor clamp and said actuating means comprises crank arms respectively fixed to said associated stack insulators with their upper ends rotatably journalling said respective switch blade offset portions adjacent said clamping elements whereby rotation of said operating arms with their associated insulator stacks simultaneously twists said blades on their respective axes and arcuately swings said blades in a vertical plane.

8. A rigid bus conductor switching station for kv. power line systems having at least one series of branch conductors comprising a cooperating series of rigid bus conductors; a plurality of lally columns axially spaced along and supporting each of said rigid bus conductors of said series; a respective insulator stack for each lally column; a stationary contact member individual to each of said series of branch conductors; and a disconnect switch mechanism individual to and supported by a respective one of said insulator stacks of each rigid bus conductor, each switch mechanism comprising a terminal member forming a rigid bus support clamp and a switch blade hinge pivot, a switch blade journalled on said switch blade hinge pivot for movement of its swing end into and out of engagement with said contact member of its respective cooperating branch conductor and a switch blade actuating means interconnecting said switch blade and its respective insulator stack, each of said respective insulator stacks being journalled in its associated terminal member and rotatably supported by its lally column to effect operation of said switches upon rotation of their respective associated insulator stacks.

9. The switching station of claim 8 wherein said contact members each comprises spaced jaws terminating in flared portions for receiving the swing end of said switch blades and said respective insulator stacks are operatively interconnected for simultaneous rotation.

10. The switching station of claim 9 wherein each of said switch blades comprises a contact engaging flat end, a hinge pivot section adjacent its other end and wherein said actuating means comprises crank arm means operably connected to said switch blade and a respective insulator stack to twist said switch blade in its respective contact jaws for engaging the flat end of said blade edgewise therebetween.

11. The switching station of claim 9 wherein said bus support clamp comprises a through conductor clamp and said blade actuating means comprises a switch operating arm fixedly mounted on its associated insulator stack at the upper end thereof and extending upwardly in free spaced relation to its associated rigid bus conductor, the upper end of said operating arm rotatably journalling said switch blade near the pivoted end thereof and being angularly related to the axis of rotation of its associated insulator stack whereby rotation of said operating arm with its associated insulator stack simultaneously twists and arcuately swings said blade in a vertical plane between a substantially horizontal position and a substantially vertical position, said switch blade being twistably forceably engaged with said jaw contacts in said vertical position.

12. The switching station of claim 10 wherein said support clamp comprises a through conductor clamp and said actuating means comprises a first crank arm fixed to its associated insulator stack at the upper end thereof and extending upwardly around its associated rigid bus conductor, a second crank arm operably connected at one end to the upper end of said first crank arm for swinging movement of its swing end around a vertical axis, a universal knuckle pivotally connected to the swing end of said second crank arm for swing movement therewith in a plane parallel to the pivotal axis of said switch blade hinge pivot, a rod pivotally connected to said knuckle joint on an axis parallel to said switch blade hinge pivot axis and terminating in a swivel joint rigid in an axial direction with respect to said rod, a rod terminal connected in coaxial relation to said swivel joint, a blade twisting ferrule fixedly joined to said blade and pivotally connected to said rod terminal on an axis parallel to said switch blade hinge pivot axis.

13. The switching station of claim 10 wherein said support clamp comprises at least two interconnected spaced apart clamp portions adapted to join the adjacent ends of two axial spaced rigid bus conductor sections, said actuating means comprising a stub shaft mounted on the upper end of its associated insulator stack for rotation therewith and extending upwardly at right angles to said hinge pivot axis between said clamp portions and journalled in the interconnecting portion of said support clamp, a crank arm mounted at one end on said stub shaft for rotation therewith and its respective insulator stack, a universal knuckle pivotally connected to the swing end of said crank arm for swinging movement therewith, a push rod pivotally connected at one end to said knuckle joint on an axis parallel to said switch blade hinge pivot axis and terminating at its other end in an axially directed swivel joint socket, a rod terminal having an axially directed swivel pin disposed in said socket of said rod to form a swivel joint and a right angular pivotal connection at its other end, a blade twisting ferrule fixedly joined to said blade and pivotally connected to said right angular pivotal connection of said rod terminal on an axis parallel to said switch blade hinge pivot axis.

14. A switching station for kv. power line systems comprising a switch carrying series of rigid bus conductors; a first contact carrying series of bus conductors equal in number to and spaced from said switch carrying series of rigid bus conductors in juxtapositioned spaced planar relation to said rigid bus conductors; a second series of aerial bus conductors equal in number to and in juxtapositioned spaced relation to said series of rigid bus conductors; a contact member individual to each conductor of said series of aerial conductors and to each conductor of said contact carrying series of bus conductors, said contact members of said two series of bus conductors being in vertically opposed planar paired relation; a plurality of lally columns spaced axially apart along and supporting each of said rigid bus conductors of said switch carrying series of rigid bus conductors, said lally columns of each of said rigid bus connections comprising a support base and a single vertically standing insulator stack mounted on said support base and terminating at its upper end in a bus conductor clamp for rigid clamping about its associated rigid bus conductor in supporting relation thereto, one of said bus conductor clamps of each rigid bus conductor having an extension terminating in a switch blade hinge pivot; disconnect switch blades individual to and supported by said respective blade hinge pivots, said switch blades being respectively mounted for arcuate movement in the vertical plane of and between an opposed pair of said contact members and being of a length to alternately engage respective ones of said opposed pair of contact members; and actuating means for moving said respective switch blades to selectively establish electrical circuits between said switch carrying series of rigid bus conductors and said series of aerial conductors and said contact carrying series of bus conductors, said actuating means being individual to and fixedly connected to the insulator stacks supporting said blade hinge pivot bus conductor clamps and said last mentioned insulator stacks being rotatably supported on said support bases for imparting movement to said actuating means.

15. The switching station of claim 14 wherein said contact members each comprise spring biased spaced jaws for receiving respective ones of said switch blade arms therebetween.

16. The switching station of claim 15 wherein said switch blades are each provided with a contact engaging beaver tail end and said actuating means comprises respective means operably connected to said switch blades to individually twist said switch blades in their associated contact jaws for forceably engaging the beaver tail end of said blades edgewise therebetween against said spring bias thereby establishing a high pressure small area electrical contact.

17. An improved rigid bus conductor switching station for kv. transmission line disconnect switching systems comprising a polyphase series of rigid aerial bus conductors disposed in side-by-side laterally spaced relation; a cooperating polyphase series of aerial bus conductors disposed in side-by-side laterally spaced relation; respective stationary contacts electrically mounted on each conductor of said cooperating series of aerial conductors in switching relation to said series of rigid aerial bus conductors; a plurality of lally columns for supporting each rigid bus conductor of said series of said rigid aerial bus conductors including a respective insulator stack mounted in end supported relation on each lally column and terminating at its upper end in a rigid bus conductor support clamp electrically connected to a respective rigid bus conductor, at least one of said insulator stacks associated with each of said rigid bus conductors, being journalled for rotation around its axis and relative rotation to its support clamp; switch hinge pivot means mounted on the support clamp of each rotatable insulator stack; switch actuating means fixed to each rotatable insulator stack for rotation therewith; a switch blade journalled adjacent one end in each switch hinge pivot means to provide respective blade swing end electrical connections for cooperation with said stationary contacts and respective hinge end electrical connections between each switch blade and its related bus support clamp; and means respectively interconnecting said one end of each switch blade and said switch actuating means to operatively swing and bodily twist said respective switch blade to alternately electrically connect and disconnect said swing ends of said switch blades with the respective stationary contacts of said cooperating polyphase series of aerial bus conductors to complete and disrupt an electrical circuit between respective conductors of said cooperating series of aerial bus conductors.

18. The switching station of claim 17, wherein said one end of each switch blade has an angularly offset terminal portion and said means respectively interconnecting said one end of each switch blade and said actuating means comprises a journal formation rigidly associated with said actuating means and rotatably receiving said respective angularly offset terminal portions of said switch blades.

19. The switching station of claim 17 wherein said means respectively interconnecting said one end of each switch blade and said actuating means comprises a respective twisting ferrule non-rotatably connected to said blade, a push rod assembly comprising a rod terminal pivotally connected to said twisting ferrule and a rod member swivel connected at one end to said rod terminal to permit relative rotation between said rod terminal and rod member and a universal knuckle interconnecting the other end of said rod member to said actuating means.

20. The switching station of claim 17 together with means for interconnecting the respective rotatable insulators of said series of rigid aerial bus conductors for simultaneous rotation.

21. An improved rigid bus conductor switching station for kv. transmission line disconnect switching systems comprising a rigid bus conductor, a plurality of lally columns supporting said conductor at spaced intervals intermediate the ends thereof and each comprising a support base, a single insulator stack projecting vertically from said bases and terminating in a bus conductor clamping element for rigid clamping about said bus conductor in supporting relation thereto, the improvement which comprises means for mounting one of said insulator stacks for rotation about its axis relative to its associated clamping element, means providing the clamping element associated with the rotatable one of said insulator stacks with an electrically conducting extension terminating in a switch hinge pivot extending transverse to and in spaced relation above said rigid bus conductor, an elongated switch blade journalled adjacent one end about the axis of said switch hinge pivot for arcuate swing movement in a plane substantially coincident with said rigid bus conductor and rotational twisting movement around its own longitudinal axis, and switch actuating means interconnecting said rotatable insulator stack and said switch blade for effecting swinging and twisting movement of said switch blade upon rotation of the rotatable one of said insulator stacks.

References Cited in the file of this patent

UNITED STATES PATENTS 2,717,287    Sihler et al.    Sept. 6, 1955
2,830,145    Killian    Apr. 8, 1958